United States Patent [19]

San-Nohe et al.

[11] Patent Number: 5,371,559
[45] Date of Patent: Dec. 6, 1994

[54] LIGHT VALVE IMAGE PROJECTION APPARATUS

[75] Inventors: sinya San-Nohe, Osaka; Takaaki Tanaka, Katano; Yoshito Miyatake, Nayagawa, all of Japan

[73] Assignee: Matsushita Electric Industrial Co., Ltd., Osaka, Japan

[21] Appl. No.: 975,632

[22] Filed: Nov. 13, 1992

[30] Foreign Application Priority Data

Nov. 15, 1991 [JP] Japan ................. 3-300128

[51] Int. Cl.$^5$ ............................................ G03B 21/14
[52] U.S. Cl. ........................................ 353/31; 353/97
[58] Field of Search .................. 353/30, 31, 33, 34, 353/37, 69, 70, 97, 101; 359/40

[56] References Cited

U.S. PATENT DOCUMENTS

| | | | |
|---|---|---|---|
| 3,963,337 | 6/1976 | Lundberg | 353/101 |
| 4,824,210 | 4/1989 | Shimazaki | 353/119 |
| 4,850,685 | 7/1989 | Kamakura et al. | 353/31 |
| 4,936,657 | 6/1990 | Tejima et al. | 353/122 |
| 5,042,929 | 8/1991 | Tanaka et al. | 359/708 |
| 5,096,288 | 3/1992 | Yano et al. | 353/30 |

FOREIGN PATENT DOCUMENTS

| | | |
|---|---|---|
| 0409246 | 1/1991 | European Pat. Off. . |
| 62-3227 | 1/1987 | Japan . |
| 62-186225 | 8/1987 | Japan . |
| 63-73782 | 4/1988 | Japan . |
| 2-5082 | 1/1990 | Japan . |
| 3-7110 | 1/1991 | Japan . |
| 3-43780 | 1/1991 | Japan . |
| 3-75617 | 3/1991 | Japan . |
| 3-146941 | 6/1991 | Japan . |
| 3-259131 | 11/1991 | Japan . |
| 4-22938 | 1/1992 | Japan . |

*Primary Examiner*—William A. Cuchlinski, Jr.
*Assistant Examiner*—William C. Dowling
*Attorney, Agent, or Firm*—Wenderoth, Lind & Ponack

[57] ABSTRACT

A light valve image projection apparatus includes a light source, field lens, liquid crystal panel, a projection lens assembly, and projection screen. The projection lens has a stop forming an aperture of the lens assembly decentered from the optical axis of the lenses of the projection lens assembly in the vertical scanning direction of the liquid crystal panel. Principal rays are approximately parallel to each other within the effective field angle on the side of the liquid crystal cell. In the light valve image projection apparatus principal rays, parallel to each other, are irradiated on the liquid crystal panel at an angle resulting in the highest contrast ratio to produce a projected image having uniformity and high contrast.

27 Claims, 11 Drawing Sheets

ANGLE OF PRINCIPAL RAY θ [deg.]

LIGHT VALVE IMAGE PROJECTION APPARATUS

BACKGROUND OF THE INVENTION

1. Field of the Invention

The present invention relates to a light valve image projection apparatus which projects an optical image formed on a light valve onto a projection screen in an expanded projection manner.

2. Description of the Prior Art

In order to obtain a large screen image, there has been conventionally known a method of forming an optical image on a light valve according to a video and irradiating light beams to the optical image formed on the light valve to project the optical image onto a projection screen by means of a projection lens system an expanded projection manner. Lately, a growing attention has been paid to a light valve image projection apparatus in which a liquid crystal display unit (referred to as "LCD" hereinafter) is employed as a light valve.

FIG. 8 shows a schematic form of a light valve image projection apparatus employing an LCD as a light valve. Representative light bundles of rays A, B and C emitted from a light source 1 pass through an LCD 2 to be applied as incident light rays to a projection lens assembly 3. The LCD 2 comprises of an input side polarizing plate 4, a liquid crystal cell layer 5 and an output side polarizing plate 6. The liquid crystal cell layer 5 is formed by sealing twisted nematic liquid crystals 9 between two glass plates 7 and 8. Each of the glass plates 7 and 8 is provided with transparent pixel electrodes arranged in a matrix on the inner surface thereof in contact with the liquid crystals 9.

The polarization axis of the input side polarizing plate 4 and the polarization axis of the output side polarizing plate 6 cross each other at right angles with each polarization axis being inclined at an angle of 45° with respect to the vertical scanning direction of the liquid crystal cell layer 5. When no voltage is applied to the transparent pixel electrodes arranged in the glass plates 7 and 8, a linearly polarized light ray output through the input side polarizing plate 4 is rotated at an angle of 90° due to an optical rotatory power of the liquid crystal cell layer 5 to achieve a maximum transmittance of the polarized light rays passing through the LCD 2. When applying a voltage to the transparent pixel electrodes, the effect of the optical rotatory power in the liquid crystal cell layer 5 is reduced as the applied voltage changes to thereby reduce the transmittance of the polarized light rays.

Thus, an optical image corresponding to a video signal is formed in the LCD 2 as a variance of the transmittance of the polarized light rays, and the obtained optical image of the video signal is projected onto a projection screen 10 in an expanded projection manner by means of the projection lens assembly 3.

An LCD employing twisted nematic liquid crystals exhibits a highest contrast ratio when a voltage is applied to the LCD in such a manner that the alignment direction of the liquid crystal molecules coincides with a travelling direction of an incident light ray.

FIG. 9 shows an example of the relationship between an incident angle of an incident light ray and an contrast ratio of an LCD. A principal light ray which is the dominant ray of a conical bundle of rays incident on the optical image plane of the liquid crystal cell layer is directed within a plane including the normal of the liquid crystal cell layer 5 and the vertical scanning direction of the LCD. It is now assumed that the principal ray and the normal of the liquid crystal cell layer cross each other at an angle $\theta$.

As is apparent from FIG. 9, a highest contrast ratio is achieved when the angle $\theta$ is $\theta_0$ slightly inclined from an angle 0°, and the contrast ratio decreases as the angle $\theta$ deviates from the angle $\theta_0$. It is noted here that the angle $\theta$ is defined as "the angle of the principal ray" hereinafter.

In the case of an arrangement as shown in FIG. 8, generally the angle $\theta$ of the principal ray incident on the liquid crystal cell layer 5 within an effective field angle increases toward the periphery from the optical axis ($\theta = 0°$) of the projection lens 3.

As shown in FIG. 10, in the above case, the contrast ratio in the vertical direction of the projected image on the projection screen takes its maximum value when the angle $\theta = \theta_0$ and the contrast ratio decreases as the angle deviates from the contrast peak angle $\theta_0$. Therefore, the contrast ratio has its peak at a place displaced from the center of the projected image and is lower at places above and below the peak, which incurs asymmetric nonuniformity of contrast in the projected image thereby adversely influencing the picture quality.

In order to eliminate the above-mentioned problems and improve the uniformity of contrast, Sakamoto et al. discloses a projection apparatus having a pair of convex lenses on both sides of a liquid crystal panel in Japanese Patent Application Laid-Open No. HEI-3-146941, while Nakamura discloses a reflector and a light ray guide in combination in an illumination optical system in the Japanese Patent Application Laid-Open No. HEI-4-22938, parallel light rays being incident on the liquid crystal panel in each of the disclosed apparatus. However, in either one of the conventional apparatus, the angle of the principal ray incident on the liquid crystal panel is 0° but not equal to $\theta_0$, which is consequently insufficient for obtaining a high contrast ratio.

Various apparatus in which a liquid crystal panel is inclined at a specified angle toward the maximum contrast view angle from the vertical plane with respect to the optical axis are disclosed in Japanese Patent Application Laid-Open No. SHO-62-186225 by Nakamura et al., in U.S. Pat. No. 4,824,210 by Shimazaki, in Japanese Patent Application Laid-Open NO. HEI-3-71110 by Kishimoto et al., and in Japanese Patent Application Laid-Open No. HEI-3-75617 by Hosoi et al. It is also possible to make the angle of the principal ray incident on the liquid crystal panel optimum for achieving high contrast by employing variation of the above-mentioned apparatus. However, it is necessary to incline the projection screen plane from the plane perpendicular to the optical axis of the projection lens in order to satisfactorily focus the projected image thereon. Even when the projection screen plane is inclined, a trapezoidal distortion takes place in the projected image, which makes it difficult to obtain a high quality picture.

Other apparatus employing an optical component such as a prism, a fibrous plate acting as a prism or a fine stepped prism having a sawtooth-shaped cross section disposed on the output side of the liquid crystal panel and refracting a light ray incident on the liquid crystal panel at the angle for achieving the highest contrast ratio with respect to the optical axis of the projection lens, are disclosed in Japanese Patent Application Laid-Open No. SHO-62-3227 by Tanaka et al., in U.S. Pat. No. 4,936,657 by Tejima et al., in Japanese Patent Application Laid-Open No. HEI-3-43780 by Oka et al., and in Japanese Patent Application Laid-Open No. HEI-3-259131 by Nakanishi et al. In any of the above-mentioned apparatus, the light rays incident on the liquid crystal panel have an incident angle for achieving a high contrast ratio and efficiently converge the light rays into the entrance pupil of the projection lens. However, the above-mentioned optical components are arranged between the liquid crystal panel and the projection lens, which makes it difficult to compensate for various aberrations of the projection lens. Furthermore, when using an element having a fine stepped structure, the element must be arranged in the vicinity of the optical image plane of the liquid crystal panel. Therefore, an expanded image of the fine structure fatally appears on the projected image, which also results in difficulty in obtaining a high-quality projected image in any event.

Various apparatus in which the central axes of the liquid crystal panel, projection lens, and projection screen are displaced to irradiate light rays in an oblique direction onto the liquid crystal panel for achieving the highest contrast ratio are disclosed in Japanese Patent Application Laid-Open No. SHO-63-73782 by Horiuchi et al. and in Japanese Patent Application Laid-Open No. HEI-2-5082 by Ohba.

FIG. 11 shows, schematically, the structure of the above-mentioned apparatus. The center of the image forming frame of the liquid crystal cell layer 5 is displaced vertically with respect to the optical axis of the projection lens 3 so that the field angle $\theta = \theta_0$, at which the projected image has the maximum contrast ratio, is subtended from a location near the center of the liquid crystal cell 5.

FIG. 12 shows the contrast ratio in the vertical direction of the projected image in the above-described apparatus. With the apparatus shown in FIG. 11, an area around the center of the projection screen can be made to exhibit the peak contrast ratio to prevent a possible occurrence of asymmetrical nonuniformity. However, the contrast ratio reduces toward the periphery of the liquid crystal cell layer, which also leaves unsolved the problem that no uniformity can be ensured throughout the area of the projected image area. Furthermore, the liquid crystal cell layer 5 is displaced in parallel in the vertical direction with respect to the optical axis of the projection lens 3, which requires the projection lens to have a wide angle and makes asymmetrical the range of field angle for use in the vertical direction of the projected image. The brightness of the projected image at an arbitrary point is proportional to the product of the fourth power of the cosine of the field angle and the vignetting factor of the projection lens, and therefore the brightness depends greatly on the field angle. Therefore, when the range of field angle for use is asymmetrical, there arises another problem that the brightness varies when the lens is in different vertical positions.

SUMMARY OF THE INVENTION

Accordingly, an essential object of the present invention is to provide a light valve image projection apparatus capable of obtaining a projected image having a uniform and high contrast throughout the area thereof.

A light valve image projection apparatus in accordance with the present invention employs a projection lens assembly including at least one decentering aperture stop the aperture center of which is decentered from the optical axis of the lenses of the lens assembly in the vertical scanning direction of the liquid crystal cell. The angle $\theta$ of the principal ray is established according to the extent of the eccentricity of the aperture formed by the stop. When the stop is decentered in such a manner that the angle $\theta$ of the principal ray on the optical axis of the projection lens is $\theta_0$ at which the contrast ratio takes its maximum value, the angle $\theta$ of the principal ray transmitted through the center of the image forming area of the liquid crystal cell is $\theta_0$ without impairing the uniformity of image quality and brightness other than contrast to produce a projected image having a high contrast ratio. That is, in the incident light bundles A, B and C as shown in FIG. 8 for example, the lower half portions a, b and c with respect to the respective principal rays are utilized and the other halves of the light bundles are cut off by the stop. Furthermore, the projection lens assembly receives principal rays which are approximately parallel to each other from the side of the liquid crystal cell within the effective field angle, whereby improved uniformity of the high contrast can be achieved.

BRIEF DESCRIPTION OF THE DRAWING

These and other objects and features of the present invention will become apparent from the following description of the preferred embodiments thereof made with reference to the accompanying drawings, in which.

DETAILED DESCRIPTION OF THE PREFERRED EMBODIMENTS

The following describes a preferred embodiment of the present invention with reference to FIGS. 1 through 7.

Figure 1:
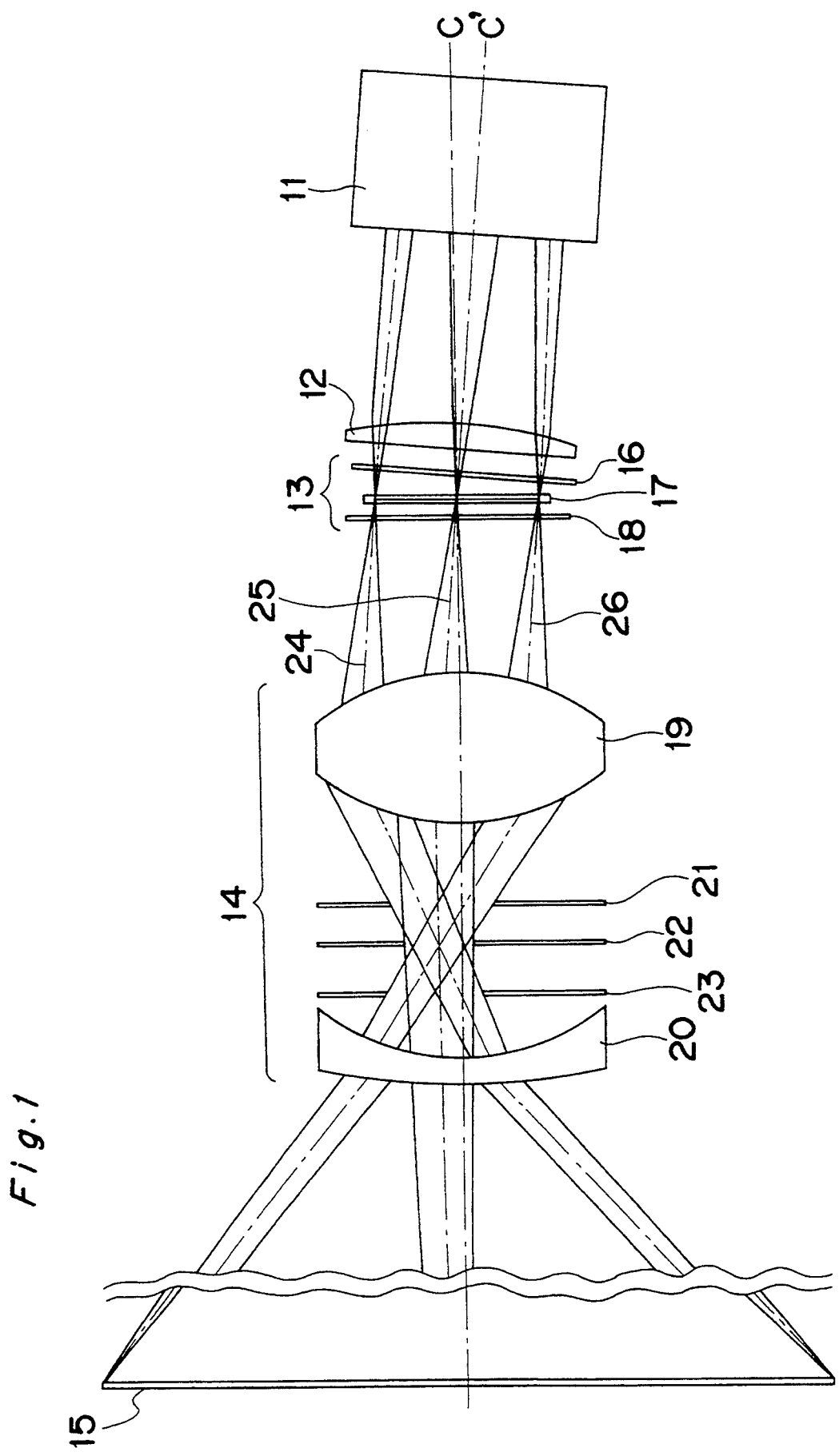
FIG. 1 is a schematic view of one embodiment of a light valve image projection apparatus in accordance with the present invention.

FIG. 1 shows an embodiment of a light valve image projection apparatus in accordance with the present invention. A liquid crystal panel 13 taking advantage of a birefringence or rotatory polarization characteristic comprises an input side polarizing plate 16, a liquid crystal cell layer 17 and an output side polarizing plate 18, and has a structure similar to that of a conventional liquid crystal panel. That is, the liquid crystal cell layer 17 is formed by sealing twisted nematic liquid crystals between two glass plates. Each of the glass plates is provided with transparent pixel electrodes arranged in a matrix on the inner surface thereof in contact with the liquid crystals. A field lens 12 is disposed in front of the input side polarizing plate 16 to adjust the direction of the light rays irradiated from the light source 11.

A projection lens assembly 14 comprises a rear lens unit 19 and a front lens unit 20, and a stop between the rear lens unit 19 and the front lens unit 20. The stop consists of a first aperture stop member 21 at a rear position, a second aperture stop member 22 at a middle position and a third aperture stop 23 at a front position between the rear lens unit 19 and the front lens unit 20 in this order from the side of the light source 11, each aperture stop member having a circular aperture. The three aperture stop member 21, 22 and 23 each have an aperture decentered by an appropriate distance from the optical axis C of the projection lens assembly 14 in the vertical scanning direction of the liquid crystal cell layer 17 (upward direction in FIG. 1) so as to receive the light bundles each having a principal ray directed at an angle $\theta_0$ with respect to the normal of the liquid crystal cell layer 17.

An optical image corresponding to a video signal is formed in the liquid crystal panel 13 as a variance of transmittance of the light rays polarized through the input side and output side polarizing plates 16 and 18, and the optical image formed in the liquid crystal panel 13 is projected onto a projection screen 15 in an expanded projection manner by means of the projection lens assembly 14.

With regard to the structure of the projection lens assembly 14, the aperture stop member 21, 22 and 23 are positioned in such a manner that two of the principal rays 24, 25 and 26 of the representation three light conical bundles (which are emitted from the light source 11) are approximately parallel to each other within an effective field angle on the side of the liquid crystal panel 13.

Figure 2:
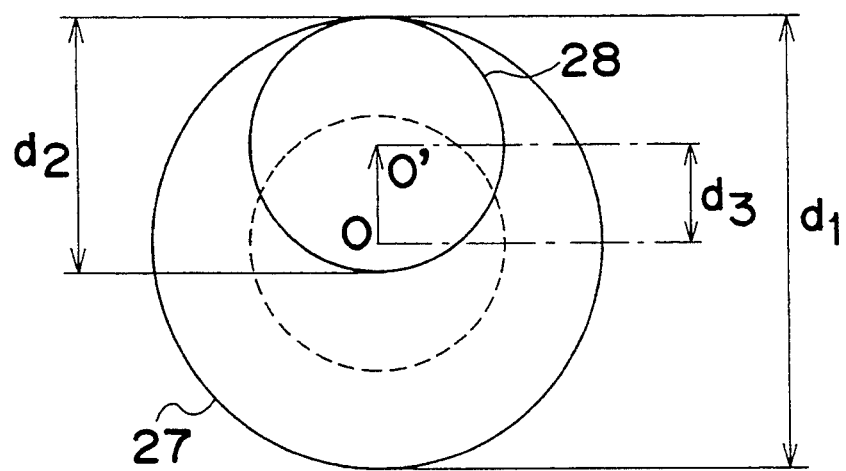
FIG. 2 is a schematic view of a projection lens pupil of the light valve image projection apparatus of FIG. 1.

The following describes the theoretical principle of the present invention with reference to FIG. 2.

FIG. 2 shows a pupil of the projection lens assembly 14 when viewed from the side of the projection screen 15, where reference mark O represents a center point of an effective aperture 27 of the projection lens assembly 14, and reference mark O' represents a center point of the decentered of the aperture stop through which the light bundles are passed, where the principal ray of each light bundle forms the highest contrast angle $\theta_0$ with respect to the normal of the liquid crystal cell layer 17.

In order to make the angle $\theta$ of the principal ray coincide with $\theta_0$, the aperture formed by the stop is required to be decentered from the optical axis of the projection lens assembly so that the point O' is positioned at the center of an effective aperture 28 of an illumination optical system. Assuming that the distance between the point O and the point O' is $d_3$, it is necessary to decenter the center point of the effective aperture 28 of the illumination optical system by the distance $d_3$. In order to make the angle $\theta$ of the principal ray coincide with the angle $\theta_0$ while assuring the effective aperture 28 necessary for the projection optical system to obtain a projected image having a sufficient brightness, it is necessary according to FIG. 2 to satisfy the following condition (1):

$$d_1 \geq d_2 + 2d_3 \qquad (1)$$

where $d_1$ represents the diameter of the effective aperture 27 of the projection lens, and $d_2$ represents the diameter of the effective aperture 28 of the illumination optical system necessary for the projection optical system.

According to a paraxial theory of a lens system, an effective F-number of a projection lens satisfies the following equation (2):

$$F = \frac{1}{2\sin\mu'} = \frac{s'}{d} \qquad (2)$$

where F represents the effective F-number, $\mu'$ represents the half-apex angle of the effective bundle of light rays passing through the center of the image forming plane of the liquid crystal cell, s' represents the distance from the principal point of the projection lens on the rear side (i.e., the side of the liquid crystal cell) to the optical image plane of the liquid crystal cell, and d represents the effective aperture.

Assuming that the effective F-number at the effective aperture 28 is $F_2$, the distance values $d_2$ and $d_3$ are, according to the equation (2), expressed by the following equations (3) and (4):

$$d_2 = \frac{s'}{F_2} \qquad (3)$$

$$d_3 = s'\sin\theta_0 \qquad (4)$$

Therefore, assuming that the angle $\theta$ of the principal ray is $\theta_0$, and the effective F-number necessary for the projection optical system employing a decentering aperture stop is $F_2$, the effective F-number $F_1$ of the projection lens is, according to the equations (1), (3), and (4), required to satisfy the following equation (5):

$$\frac{1}{F_1} \geq \frac{1}{F_2} + 2\sin\theta_0 \qquad (5)$$

When equation (5) is not satisfied, a projected image having either insufficient brightness or insufficient contrast will result. When equation (5) is satisfied, a projected image having sufficient brightness and sufficient contrast can be obtained. However, the lens diameter increases as the effective F-number $F_1$ of the projection lens decreases resulting in an accompanying increase in manufacturing cost. Therefore, the value $F_1$ is preferably as great as possible within a range satisfying the equation (5) in order to keep the lens diameter small.

In the case where a projection lens system is so constructed as to receive two arbitrary principal rays which are parallel to each other within the effective field angle at the side of the liquid crystal cell, the angle $\theta$ of the principal ray passing through the Liquid crystal cell is approximately identical at each field angle to thereby produce uniform contrast in the projected image. The projection lens is provided with a decentering aperture stop unit such that the angle $\theta$ of the principal ray on the optical axis is $\theta_0$ and the decentering aperture stop unit comprises a plurality of decentering aperture stops such that the angle $\theta$ of the principal ray at a field angle out of the optical axis is also $\theta_0$ at a plurality of positions in the projection lens system 14. Thus, the angle $\theta$ of the principal ray on the optical axis as well as the angle $\theta$ of the principal ray at a field angle out of the optical axis can be set to $\theta_0$ uniformly maintaining an approximate parallelism therebetween.

With regard to the illumination optical system from the light source, the light rays emitted from the light source can be utilized more efficiently by aligning the center axis C' of the illumination optical system with the principal ray 25 on the axis C of the projection lens system and irradiating light rays in an oblique direction onto the liquid crystal cell 17 at the angle $\theta_0$ with respect to the normal of the liquid crystal cell layer 17.

As is apparent from the above, the light valve image projection apparatus in accordance with the present invention has the advantage that the angle $\theta$ of the principal ray passing through the liquid crystal cell within the effective field angle can easily be set to $\theta_0$ either on or out of the optical axis of the projection lens by employing the decentering aperture stop unit in the projection lens system to allow a uniform and high-contrast projected image to be displayed.

Referring back to FIG. 1, in the projection lens assembly 14, the aperture stop members 21, 22 and 23 are so arranged as to receive two of the principal rays 24, 25 and 26 approximately parallel to each other within the effective field angle on the side of the liquid crystal panel 13. Assuming now that the effective F-number necessary for the projection optical system is set to 4.0 for obtaining a projected image having a sufficient brightness while the angle $\theta$ of the principal ray is set to 4.5° for achieving the highest contrast in a projected image, the equation of $F_1 \leq 2.46$ holds according to the equation (4). Therefore, the projection lens is required to have an effective F-number of 2.46 or brighter (i.e., smaller). However, the outer diameter of the projection lens increases according as the effective F-number decreases. Therefore, a projection lens having an F-number of 2.4 is employed in the present embodiment. It is noted here that the angle $\theta$ of the principal ray may be set in a range of $0° < \theta < 9°$ for achieving a high contrast in a projected image.

Light rays are irradiated from the light source 11 and pass through the field lens 12 and the input side polarizing plate 16 to be applied onto the liquid crystal cell layer 17. The field lens 12 comprises a plano-convex lens for adjusting the direction of the incident light rays. The light source 11, the field lens 12, and the input side polarizing plate 16 are similarly inclined with respect to the liquid crystal cell layer 17 so that the principal ray of the light bundle is oblique at an angle of 4.5° with respect to the normal of the liquid crystal layer 17 in the vertical scanning direction of the liquid crystal cell 17. An optical image formed on the liquid crystal cell layer 17 is transmitted through the output side polarizing plate 18 to be projected onto the projection screen 15 in an expanded projection manner by means of the projection lens assembly 14.

The second aperture stop member 22 is provided in the projection lens assembly 14 with its aperture size setting the F-number of the projection lens assembly 14 to 4.0. The second aperture stop 22 is located in the vicinity of the focal point of the rear lens unit 19 at the side of the projection screen 15 and is so decentered (upward from the optical axis C of the projection lens in FIG. 1) that the angle of the principal ray 25 in the field angle on or around the optical axis C of the projection lens assembly 14 is 4.5° with respect to the normal of the liquid crystal cell layer 17 in the vertical scanning direction thereof. The first and third aperture stop member 21 and 28 are appropriately decentered from the optical axis C to form the aperture for the principal rays 24 and 26 in the field angles outside the optical axis C of the projection lens assembly 14 so that the angle of each of the principal rays 24 and 26 can be defined as approximately 4.5° with respect to the normal of the liquid crystal cell layer 17 in the vertical scanning direction of the liquid crystal cell 17 in the same manner as That in the case of the principal ray 25. The optimum location of the first and third stop members 21 and 23 is determined by tracking the light rays out of the optical axis.

Figure 3:
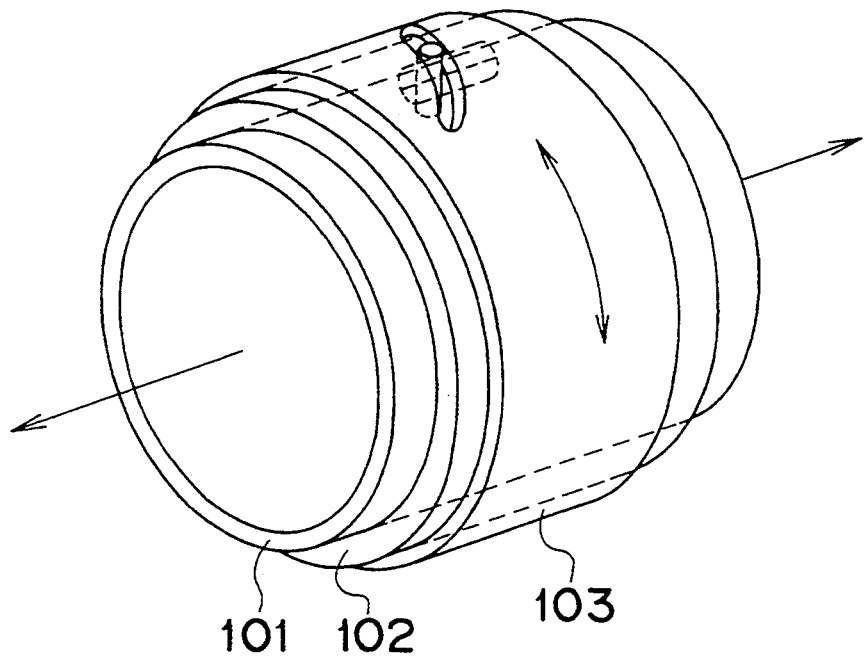
FIG. 3 is a schematic view of a projection lens-barrel of the light valve image projection apparatus of FIG. 1.

FIG. 3 shows the structure of a lens-barrel of the projection lens assembly 14. The lens-barrel includes an inside lens-barrel 101, a fixed outside lens-barrel 102 fixed to the inside barrel 101, and a cam ring 10S mounted thereon. By rotating the cam ring 103 in the direction indicated by the arrow in FIG. 3, the inside lens-barrel 101 moves in the direction of its optical axis whereby the projection lens assembly 14 can be focused without rotating the inside lens-barrel 101. With the above-mentioned arrangement, the first aperture stop members 21, the second aperture stop member 22 and the third aperture stop member 23 do not rotate around the optical axis when the projection lens assembly 14 is focused.

Figure 4:
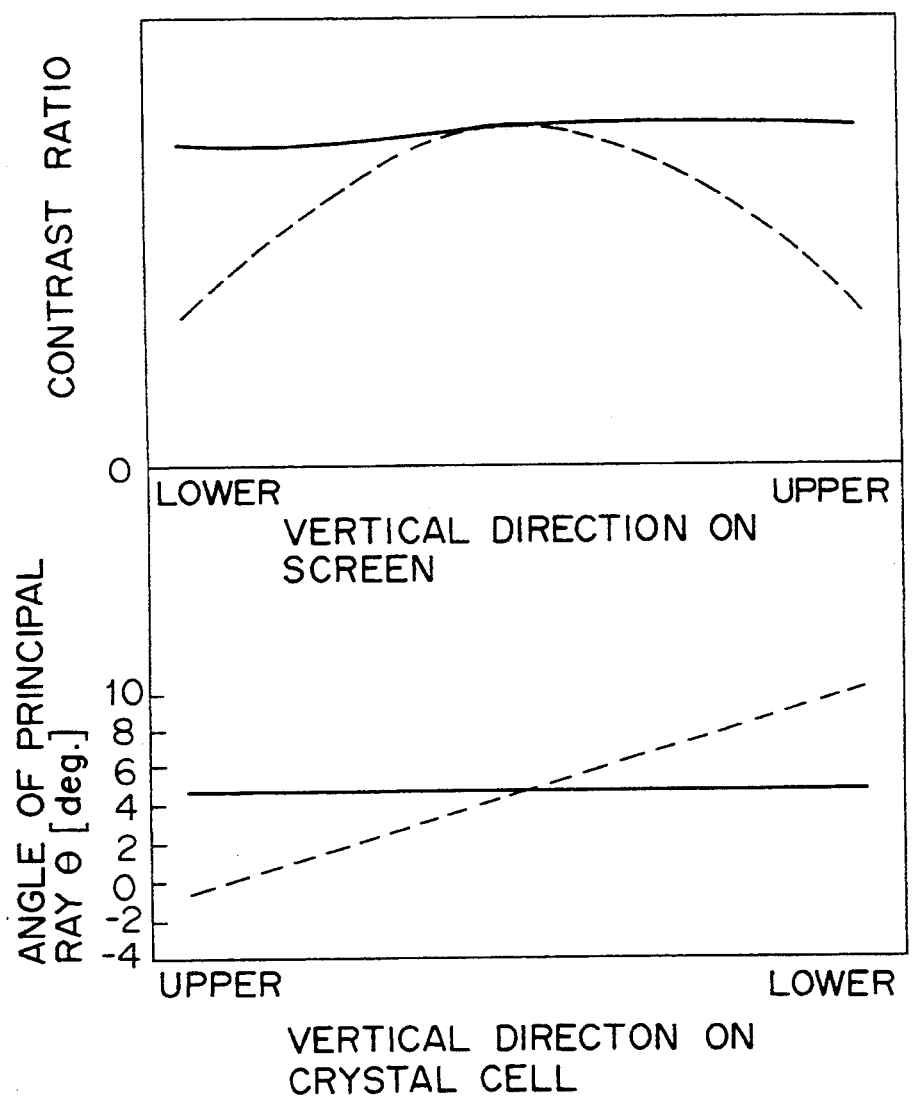
FIG. 4 is a graph of contrast ratio characteristic curves of a projected image in the light valve image projection apparatus of FIG. 1.
Figure 12:
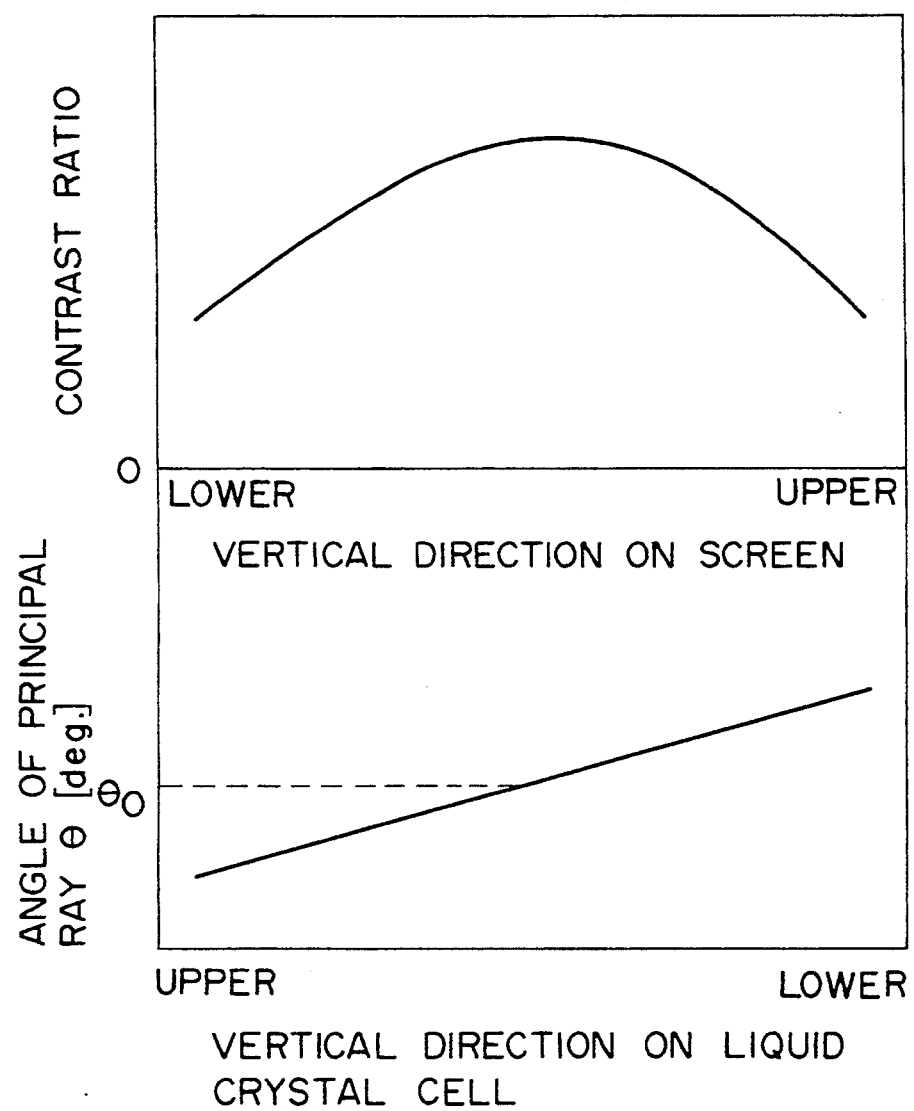
FIG. 12 is a graph of exemplified contrast ratio characteristic curves of an image projected by the light valve image projection apparatus of FIG. 11.

FIG. 4 shows a contrast ratio characteristic curve and the angle $\theta$ of the principal ray of a projected image with respect to the position on the liquid crystal cell layer 17 in the vertical direction by means of the light valve image projection apparatus of the present embodiment in comparison with those of the conventional example shown in FIG. 12. The solid lines correspond to the present embodiment and the dotted lines correspond to the conventional example. According to the apparatus shown in FIG. 1, the principal rays 24, 25, and 26 are approximately in parallel to each other, and the angle $\theta$ of each of the principal rays is set to approximately 4.5° to obtain a uniform and high contrast ratio of the image projected on the projection screen 15.

Figure 5:
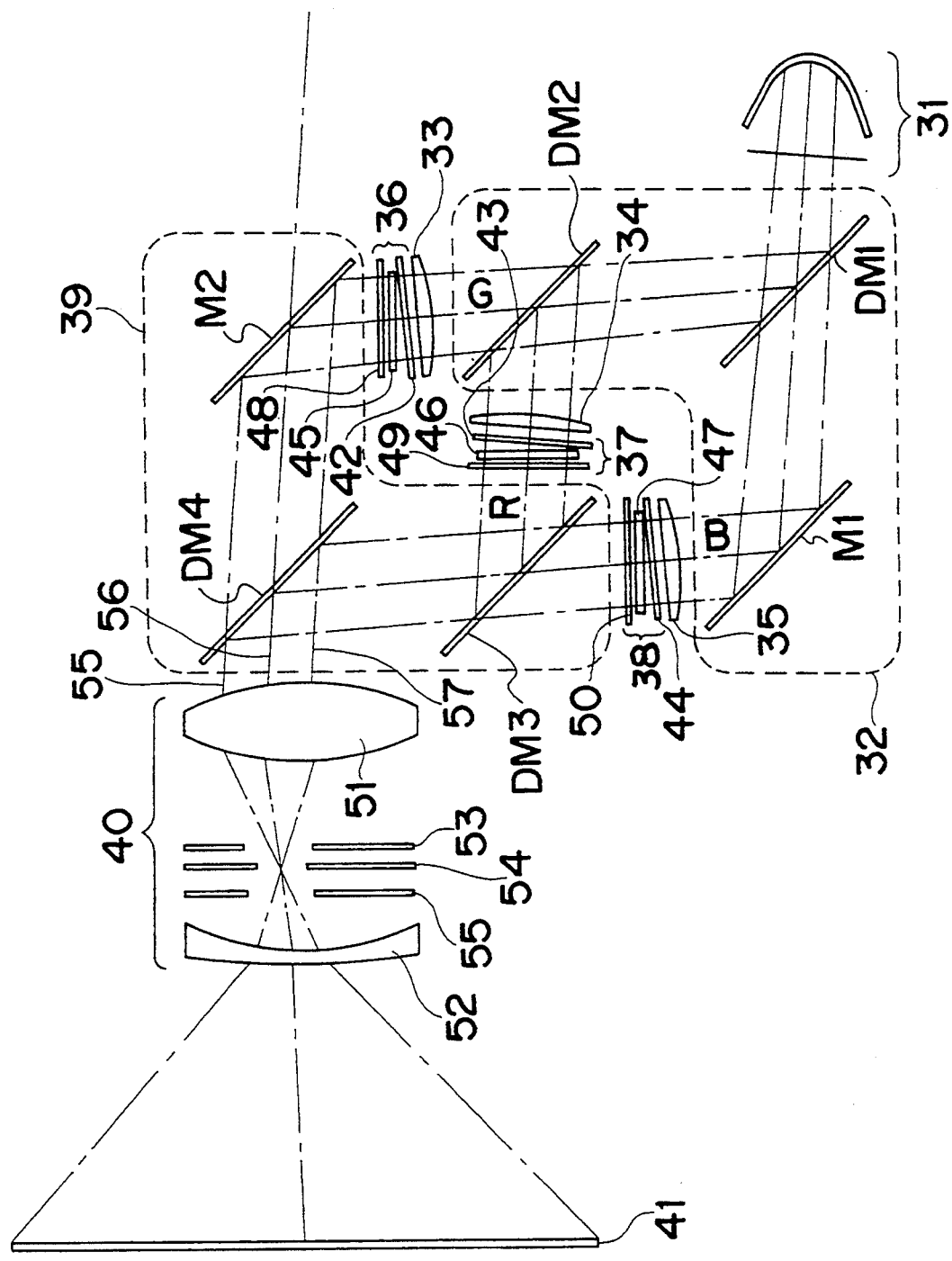
FIG. 5 is a schematic view another embodiment of a light valve image projection apparatus in accordance with the present invention.

FIG. 5 shows another embodiment of a light valve image projection apparatus in accordance with the present invention, where liquid crystal panels 36, 37 and 38, and a projection lens assembly 40 have the same structures as those of the apparatus shown in FIG. 1.

Light rays irradiated from a light source 31 are separated into three primary colored light rays of blue (B), green (G) and red (R) by means of a color separator 32 consisting of two dichroic mirrors DM1, DM2 and a reflection mirror M1 and then transmitted through field lenses 33, 34, and 35 respectively. The three primary colored light rays G, R and B are respectively input to side polarizing plates 42, 43, and 44 and then applied to three corresponding liquid crystal cell layers 45, 46, and 47. The light source 31, field lenses 33, 34, and 35, and the input side polarizing plates 42, 43, and 44 are so inclined with respect to the liquid crystal cells 45, 46, and 47, respectively, that the angle of each principal light ray is set to 4.5° in the vertical scanning direction of the liquid crystal cell layers 45, 46, and 47. Optical images formed on the liquid crystal cells 45, 46, and 47 are transmitted through output side polarizing plates 48, 49, and 50 and combined (in terms of color) by means of a color combiner 39 which comprises dichroic mirrors DM3, DM4 and a reflection mirror M2. The combined optical images are projected onto a projection screen 41 by means of a projection lens assembly 40 in an expanded projection manner.

With regard to the projected image contrast characteristic in the apparatus shown in FIG. 5, principal rays 55, 56, and 57 passing through the liquid crystal cell layers 45, 46, and 47 respectively are approximately parallel to each other, and the angle $\theta$ of each of the principal rays is approximately 4.5° to obtain a uniform and high contrast ratio of the projected image as indicated by the solid line in FIG. 4 in the same manner as in FIG. 1. It is noted here that the angle $\theta$ of the principal ray may be set in a range of $0° < \theta < 9°$ for achieving a high contrast in a projected image.

Figure 6:
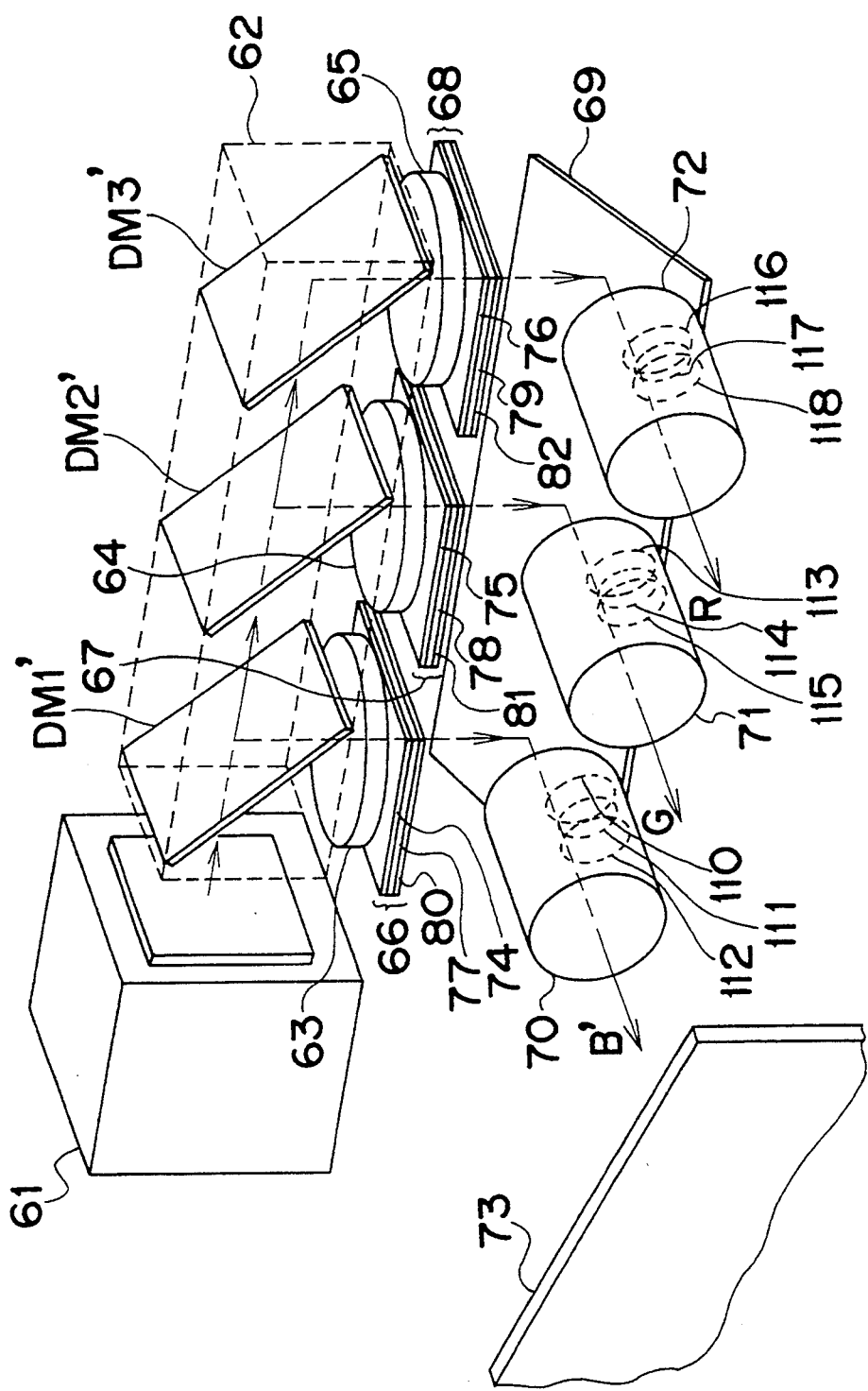
FIG. 6 is a schematic view of a projector of another embodiment of a light valve image projection apparatus in accordance with the present invention.
Figure 7:
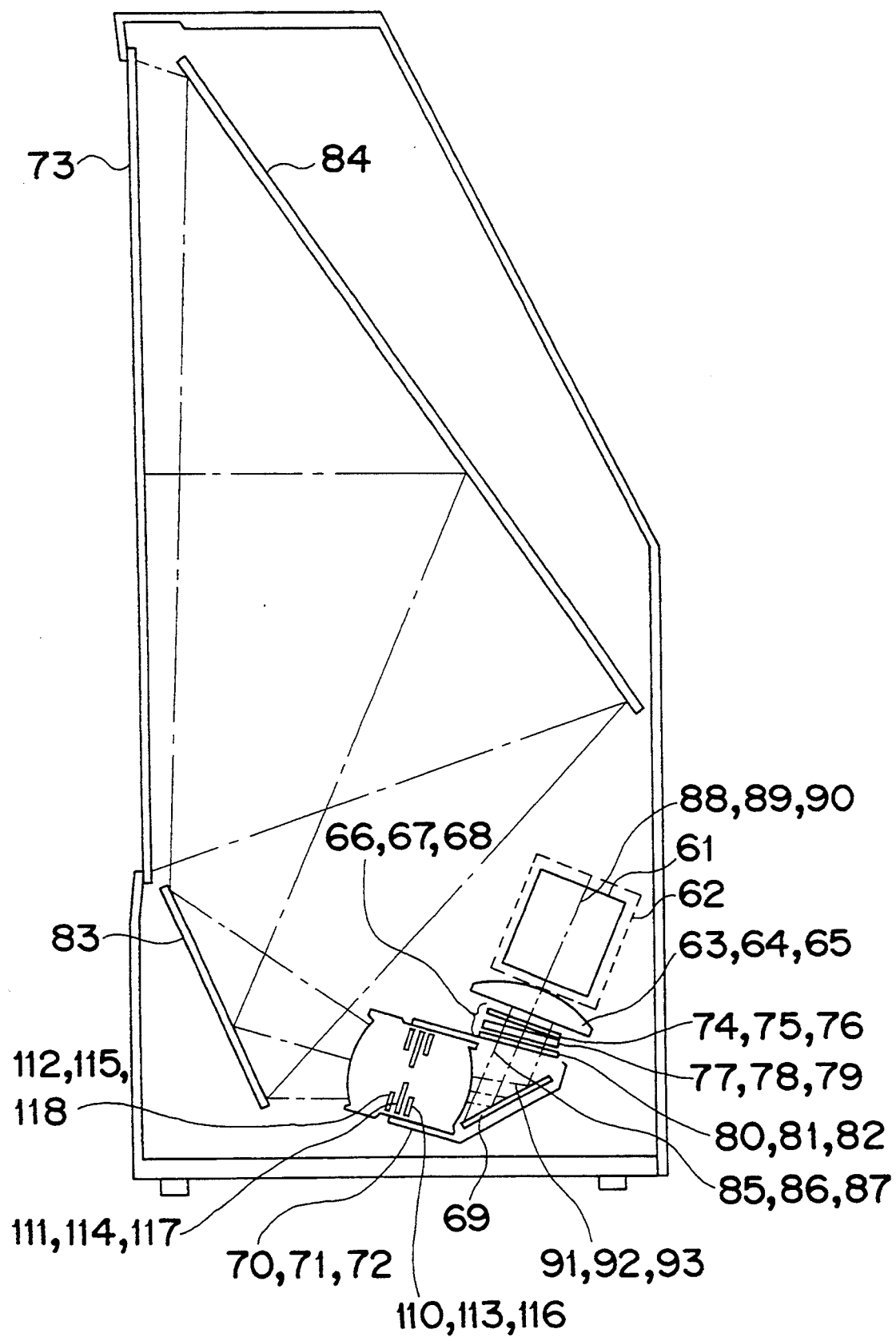
FIG. 7 is a schematic view of the components within a cabinet of the embodiment of FIG. 6.
Figure 8:
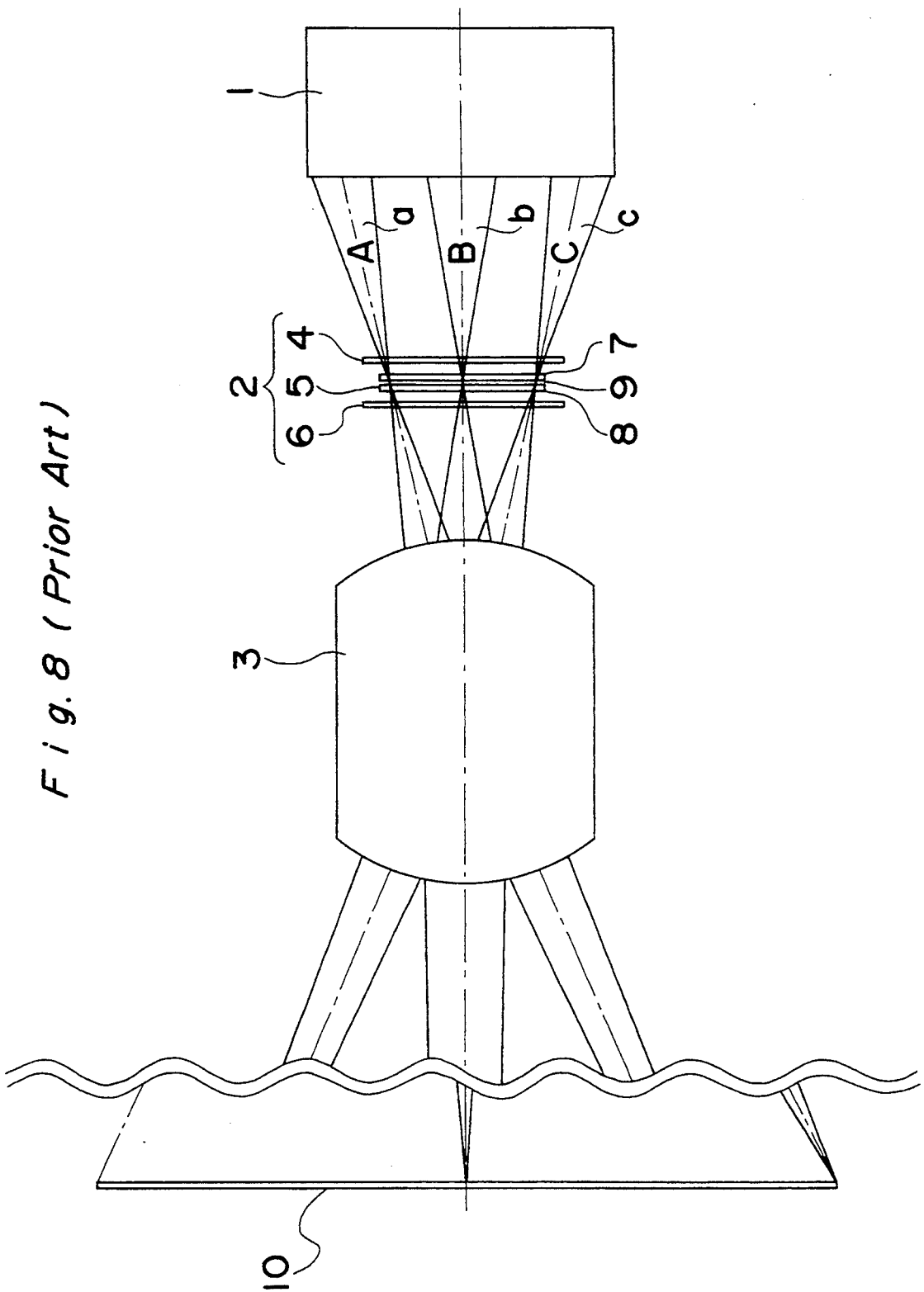
FIG. 8 is a schematic view of a conventional light valve image projection apparatus.
Figure 9:
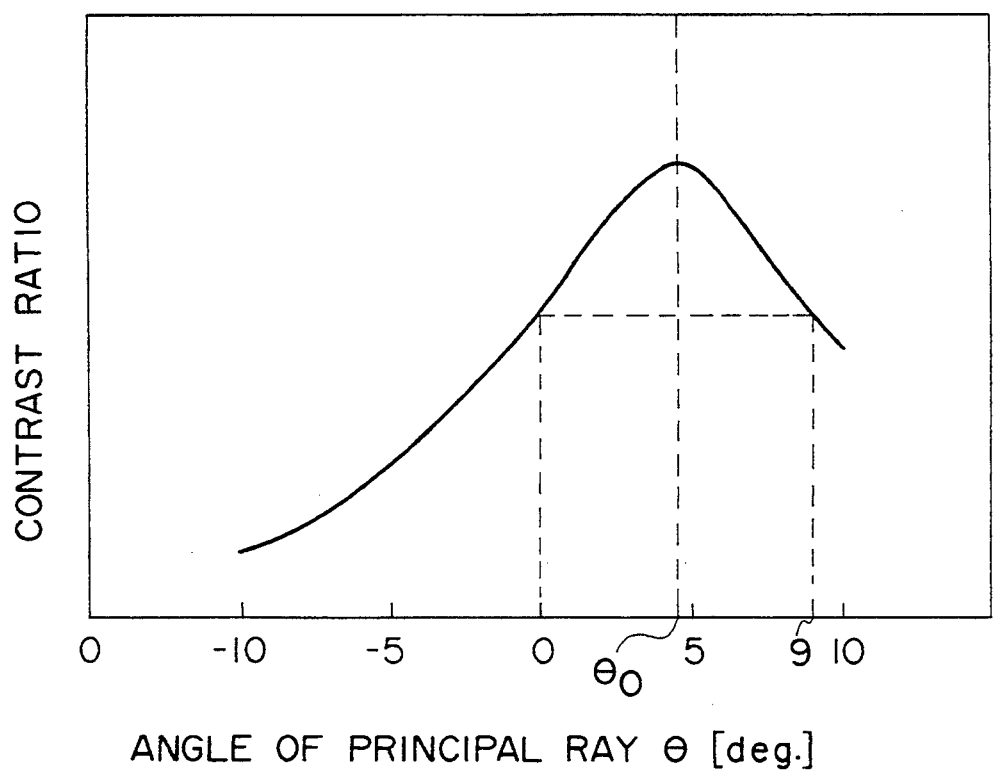
FIG. 9 is a graph of a contrast ratio characteristic curve depending on an incident angle of a light ray applied to a liquid crystal display unit.
Figure 10:
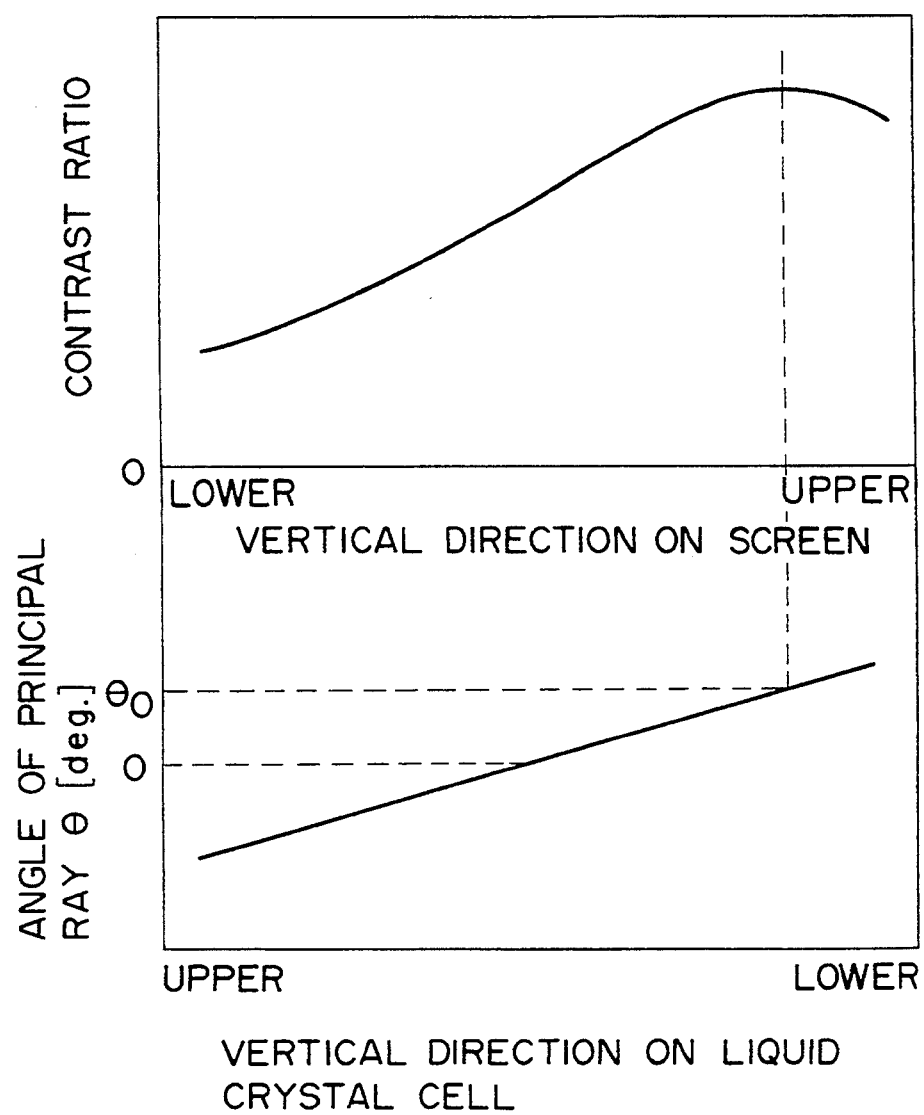
FIG. 10 is a graph of contrast ratio characteristic curves of an image projected by a conventional light valve image projection apparatus.
Figure 11:
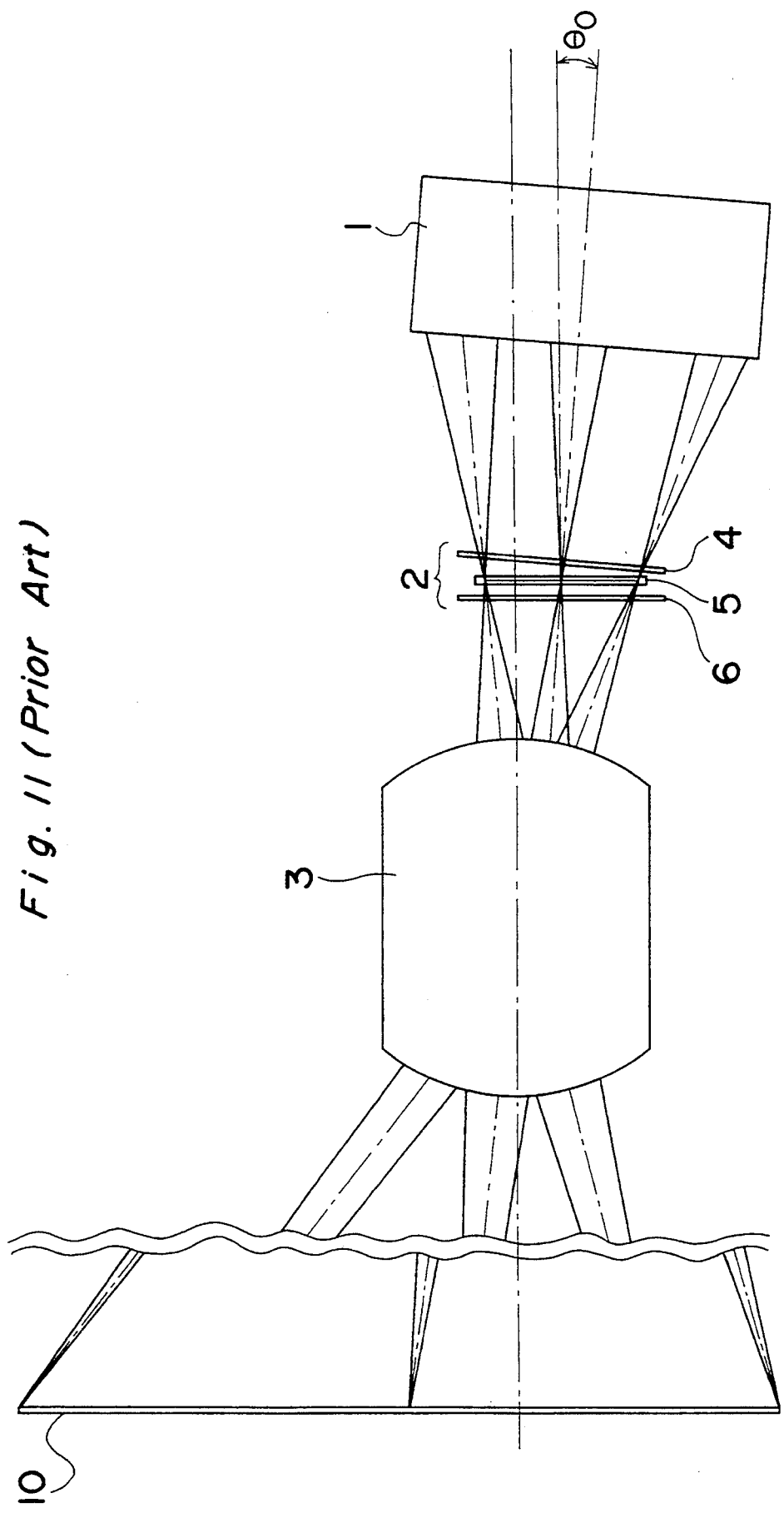
FIG. 11 is a schematic view of a light valve image projection apparatus employing a conventional projection lens.

FIG. 6 shows another example of a light valve image projection apparatus in accordance with the present invention, while FIG. 7 shows the internal structure of a cabinet including the projector. The apparatus shown FIGS. 6 and 7 is a rear type of light valve image projection apparatus employing three liquid crystal panels and three projection lens systems, where liquid crystal panels 66, 67, and 68 and projection lens systems 70, 71, and 72 are of the same type those employed in the apparatus shown in FIG. 1.

A bundle of light rays irradiated from a light source 61 is separated into three primary-colored light rays of blue (B), green (G) and red (R) by means of a color separator 62 which comprises three dichroic mirrors DM1', DM2' and DM3'. The separated primary-colored rays B, G and R are transmitted through field lenses 63, 64, and 65 and are input to side polarizing plates 74, 75, and 76, respectively, to be applied onto three corresponding liquid crystal cell layers 77, 78, and 79. The light:: source 61, field lenses 63, 64, and 65, and the input side polarizing plates 74, 75, and 76 are so inclined with respect to the liquid crystal cell layers 77, 78, and 79, respectively, that the angle of each principal light ray is 4.5° with respect to the normal of the liquid crystal cell layers in the vertical scanning direction of the liquid crystal cell layers. Optical images formed on the liquid crystal cells 77, 78, and 79 are reflected on a mirror 69 so as to be input to the projection lens systems 70, 71, and 72. Thereafter the optical images are transmitted by means of mirrors 83 and 84 to be combined and projected on a projection screen 73 in an expanded projection manner. By finely adjusting the positions of the liquid crystal panels 66 and 68 in planes perpendicular to the optical axes of the projection lens systems 70 and 72, respectively, the projected images of R, G and B are properly combined on the projection screen 73.

Principal rays 85, 88 and 91 of the primary blue color rays, principal rays 86, 89 and 92 of the primary green color rays, and principal rays 87, 90 and 93 of the primary red color rays respectively transmitted through the liquid crystal cells 77, 78, and 79 are made to be approximately parallel to each other with the angle $\theta$ of each of the principal rays approximately 4.5° by means of three stops (110, 111, 112), (113, 114, 115) and (116, 117, 118) of the projection lens systems 70, 71 and 72, respectively, in the same manner as in the embodiment of FIG. 1. It is noted here that the angle $\theta$ of the principal rays may be set in a range of $0° < \theta < 9°$ for achieving a high contrast in a projected image.

With the above-described structure, a projected image having uniformity and high contrast as indicated by the solid line in FIG. 4 can be obtained in the same manner as in the apparatus shown in FIG. 1.

Although the liquid crystal light valve employing twisted nematic liquid crystals is used in the present embodiments, other liquid crystal light valves of an LCD taking advantage of a birefringence or rotatory polarization characteristic may be used instead.

Although an aperture stop unit having a circular aperture is used in the present embodiment, the aperture stop is not always required to have a circular aperture shape and it may have a semicircular or oval aperture instead.

Although the input side polarizing plate is inclined with respect to the liquid crystal cell layer in the present embodiment, the input side polarizing plate may be parallel to the liquid crystal cell layer.

According to the present invention as described above, the projection lens assembly is provided with one or more decentering aperture stops whose aperture positions are decentered from the optical axis of the projection lens assembly in the vertical scanning direction of the liquid crystal cell, such that two of the principal rays of the incident light bundles are approximately parallel to each other within the effective field angle on the side of the liquid crystal cell. The arbitrary principal rays within the effective field angle can be transmitted through the liquid crystal cell layer 17 in an oblique direction so that the highest contrast can be achieved while making the arbitrary principal rays have approximately the same angles with respect to the normal of the liquid crystal cell layer thereby obtaining approximately parallel to each other. The invention can thus be compact and produce a projected image having uniformity and high contrast without impairing the brightness of the projected image, uniformity of brightness, resolution, and other image characteristics consequently providing a remarkably great effect.

Although the present invention has been fully described by way of examples with reference to the accompanying drawings, it is to be noted here that various changes and modifications will be apparent to those skilled in the art. Therefore, unless such changes and modifications otherwise depart from the scope of the present invention as defined by the appended claims, they should be construed as included therein.

What is claimed is:

1. A light valve image projection apparatus for projecting an optical image of a video signal, said apparatus comprising:

light valve means for forming an optical image from a video signal and for adjusting the degree to which the formed image can be transmitted therefrom by light rays;

a light source which irradiates the optical image formed by said light valve means with light rays; and projection lens means for projecting the optical image transmitted from said light valve means onto a projection screen in an expanded projection manner, said projection lens means having an optical axis, a group of lenses each concentric to the optical axis, and a stop forming the aperture of the projection lens means at a position decentered from the optical axis of said projection lens means.

2. The light valve image projection apparatus as claimed in claim 1, wherein said light valve means comprises a plurality of discrete picture elements, and said projection lens means is positioned to receive principal rays of light bundles radiating form said picture elements approximately parallel to each other within the effective field angle of said projection lens means on the side of the projection lens means facing said light valve means.

3. The apparatus as claimed in claim 1, wherein said projection lens means has an F-number satisfying:

$$\frac{1}{F_1} \geq \frac{1}{F_2} + 2\sin\theta$$

wherein $F_1$ represents the effective F-number of said projection lens means, $F_2$ represents a design F-number necessary for the light valve image projection apparatus to produce a projection image having a desiredly sufficient brightness, and $\theta$ represents an angle between a principal ray irradiated from a central portion of said light valve means and the optical axis of said projection lens means.

4. The apparatus as claimed in claim 1, wherein the stop of said projection lens means comprises three stop members disposed along the optical axis of said projection lens means.

5. The apparatus as claimed in claim 4, wherein each of said decentering stop members has a circular aperture.

6. The apparatus as claimed in claim 1, and further comprising focus adjustment means for moving a lens of said projection lens means along the optical axis thereof without permitting the rotation of the stop of said projection lens means.

7. The apparatus as claimed in claim 1, wherein said light valve means is a liquid crystal display unit having a liquid crystal panel.

8. The apparatus as claimed in claim 7, wherein the optical axis of said light source is inclined with respect to the optical axis of said projection lens means such that the light from said light source is incident on said liquid crystal panel at an oblique angle relative to the normal of said liquid crystal panel.

9. The apparatus as claimed in claim 8, wherein the angle $\theta$ is within a range of $0° < \theta < 9°$.

10. A light valve image projection apparatus for projecting an optical image of a video signal, said apparatus comprising:
a light valve consisting of three image forming panel means each for forming an optical image from a video signal and for adjusting the degree to which the formed image can be transmitted therefrom by light rays;
a light source which irradiates the optical image formed by each of the panel means of said light valve with light rays;
color separating means for separating the light rays radiating from said light source into three light rays of the primary colors, respectively, and for directing the three rays to the three image forming panel means, respectively;
color combining means for combining the optical images formed by said light valve; and
projection lens means for projecting the optical image transmitted form said light valve onto a projection screen in an expanded projection manner, said projection lens means having an optical axis, a group of lenses each concentric to the optical axis, and a stop forming the aperture of the projection lens means at a position decentered from the optical axis of said projection lens means.

11. The apparatus as claimed in claim 10, wherein each of the image forming panel means of said light valve comprises a plurality of discrete picture elements, and said projection lens means is positioned to receive principal rays of light bundles radiating from said picture elements approximately parallel to each other within the effective field angle of said projection lens means on the side of said projection lens means facing said light valve means.

12. The apparatus as claimed in claim 10, wherein said projection lens means has an F-number satisfying:

$$\frac{1}{F_1} \geq \frac{1}{F_2} + 2\sin\theta$$

wherein $F_1$ represents the effective F-number of said projection lens means, $F_2$ represents a design F-number necessary for the light valve image projection apparatus to produce a projection image having a desiredly sufficient brightness, and $\theta$ represents an angle between a principal ray irradiated from a central portion of said light valve and the optical axis of said projection lens means.

13. The apparatus as claimed in claim 10, wherein the stop of said projection lens means comprises three stop members disposed along the optical axis of said projection lens means.

14. The apparatus as claimed in claim 13, wherein each of said decentering stop members has a circular aperture.

15. The apparatus as claimed in claim 10, and further comprising focus adjustment means for moving a lens of said projection lens means along the optical axis thereof without permitting the rotation of the stop of said projection lens means.

16. The apparatus as claimed in claim 10, wherein each of said image forming panel means is a liquid crystal display unit having a liquid crystal panel.

17. The apparatus a claimed in claim 16, wherein light bundles from said light source are incident on each of the liquid crystal panels at an oblique angle of $\theta$ relative to the normals of said liquid crystal panels, respectively.

18. The apparatus as claimed in claim 17, wherein each angle $\theta$ is in a range of $0° < \theta < 9°$.

19. A light valve image projection apparatus for projecting an optical image of a video signal, said apparatus comprising:
a light valve consisting of three image forming panel means each for forming an optical image from a video signal and for adjusting the degree to which the formed image can be transmitted therefrom by light rays;
a light source which irradiates the optical image formed by each of the panel means of said light valve with light rays;
color separating means for separating the light rays radiating from said light source into three light rays of the primary colors, respectively, and for directing the three rays to the three image forming panel means, respectively; and
projection lens means for projecting the optical image transmitted form said light valve onto a projection screen in an expanded projection manner, said projection lens means having an optical axis, a group of lenses each concentric to the optical axis, and a stop forming the aperture of the projection lens means at a position decentered from the optical axis of said projection lens means.

20. The apparatus as claimed in claim 19, wherein each of the image forming panel means of said light valve comprises a plurality of discrete picture elements, and said projection lens means is positioned to receive principal rays of light bundles radiating form said picture elements approximately parallel to each other within the effective field angle of said projection lens means on the side of said projection lens means facing each light valve.

21. The apparatus as claimed in claim 19, wherein said projection lens means has an F-number satisfying:

$$\frac{1}{F_1} \geqq \frac{1}{F_2} + 2\sin\theta$$

wherein $F_1$ represents the effective F-number of said projection lens means, $F_2$ represents a design F-number necessary for the light valve image projection apparatus to produce a projection image having a desiredly sufficient brightness, and $\theta$ represents an angle between a principal ray irradiated from a central portion of said light valve and the optical axis of said projection lens means.

22. The apparatus as claimed in claim 19, wherein the stop of said projection lens means comprises three stop members disposed along the optical axis of said projection lens means.

23. The apparatus as claimed in claim 22, wherein each of said decentering stop members has a circular aperture.

24. The apparatus as claimed in claim 19, and further comprising focus adjustment means for moving a lens of said projection lens means along the optical axis thereof without permitting the rotation of the stop of said projection lens means.

25. The apparatus as claimed in claim 19, wherein each of said image forming panel means is a liquid crystal display unit having a liquid crystal panel.

26. The apparatus as claimed in claim 25, wherein light bundles from said light source are incident on each of the liquid crystal panels at an oblique angle of $\theta$ relative to the normals of said liquid crystal panels, respectively.

27. The apparatus as claimed in claim 26, wherein each angle $\theta$ is in a range of $0° < \theta < 9°$.

* * * * *